(12) United States Patent
Fan (10) Patent No.: US 11,244,153 B2
(45) Date of Patent: Feb. 8, 2022

(54) METHOD AND APPARATUS FOR PROCESSING INFORMATION

(71) Applicant: Baidu Online Network Technology (Beijing) Co., Ltd., Beijing (CN)

(72) Inventor: Xuang Fan, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 358 days.

(21) Appl. No.: 16/026,682

(22) Filed: Jul. 3, 2018

(65) Prior Publication Data

US 2019/0012362 A1    Jan. 10, 2019

(30) Foreign Application Priority Data

Jul. 4, 2017   (CN) .......................... 201710539194.6

(51) Int. Cl.
| | |
|---|---|
| *G06F 16/00* | (2019.01) |
| *G06K 9/00* | (2006.01) |
| *G06F 16/28* | (2019.01) |
| *G06F 16/2455* | (2019.01) |
| *G06F 16/909* | (2019.01) |

(52) U.S. Cl.
CPC ..... *G06K 9/00335* (2013.01); *G06F 16/2455* (2019.01); *G06F 16/285* (2019.01); *G06F 16/909* (2019.01)

(58) Field of Classification Search
None
See application file for complete search history.

(56) References Cited

U.S. PATENT DOCUMENTS

| | | | | |
|---|---|---|---|---|
| 9,589,280 | B2* | 3/2017 | Milton | G06F 16/2379 |
| 10,089,639 | B2* | 10/2018 | Kannan | G06F 16/958 |
| 10,475,075 | B2* | 11/2019 | Ismail | G06Q 30/0257 |
| 10,783,172 | B2* | 9/2020 | Milton | G06F 16/29 |
| 2008/0082466 | A1 | 4/2008 | Meijer et al. | |

(Continued)

FOREIGN PATENT DOCUMENTS

| | | |
|---|---|---|
| CN | 101201846 A | 6/2008 |
| CN | 101911055 A | 12/2010 |

(Continued)

*Primary Examiner* — Debbie M Le
(74) *Attorney, Agent, or Firm* — Seed IP Law Group LLP (57) ABSTRACT

The present disclosure discloses a method and apparatus for processing information. A specific embodiment of the method comprises: acquiring a target behavior information set; selecting, from at least two unique identity identifiers corresponding to at least two groups of identity identifiers, a unique identity identifier as a target unique identity identifier, based on at least one kind of specified user attribute information; and associating, for each target unique identity identifier of the selected target unique identity identifier, behavior information associated with identity identifiers corresponding to the target unique identity identifier with the target unique identity identifier, to obtain behavior information associated with the target unique identity identifier. According to the embodiment of the present disclosure, various kinds of behavior information of a user are associated with the target unique identity identifier, to facilitate utilization and analysis for the behavior information.

15 Claims, 6 Drawing Sheets

(56) References Cited

U.S. PATENT DOCUMENTS

| | | | | |
|---|---|---|---|---|
| 2014/0278953 A1* | 9/2014 | Ismail | ................ | G06Q 30/0251 |
| | | | | 705/14.49 |
| 2015/0006715 A1 | 1/2015 | Diehl | | |
| 2015/0235275 A1* | 8/2015 | Shah | ................ | G06Q 30/0269 |
| | | | | 705/14.66 |
| 2017/0118165 A1* | 4/2017 | Kumar | ................ | G06F 16/9537 |
| 2018/0152354 A1* | 5/2018 | Glen | ..................... | G16H 10/00 |
| 2018/0165688 A1* | 6/2018 | Ismail | ................... | G06Q 30/02 |

FOREIGN PATENT DOCUMENTS

| | | | |
|---|---|---|---|
| CN | 103731284 A | 4/2014 | |
| CN | 103780613 A | 5/2014 | |
| CN | 104484435 A | 4/2015 | |
| CN | 104488292 A | 4/2015 | |
| CN | 104756504 A | 7/2015 | |
| CN | 105761099 A | 7/2016 | |
| CN | 106528777 A | 3/2017 | |
| CN | 106572048 A | 4/2017 | |
| CN | 106598826 A | 4/2017 | |

* cited by examiner

METHOD AND APPARATUS FOR PROCESSING INFORMATION

CROSS-REFERENCE TO RELATED APPLICATION

This application claims the priority of Chinese Application No. 201710539194.6, filed on Jul. 4, 2017, entitled "Method and Apparatus for Processing Information," the entire disclosure of which is incorporated herein by reference.

TECHNICAL FIELD

The present disclosure relates to the field of computer technology, specifically to the field of Internet technology, and more specifically to a method and apparatus for processing information.

BACKGROUND

A user has many behaviors in daily life or on the Internet, thus generating many kinds of behavior information. However, in the existing technology, these kinds of behavior information are usually randomly distributed, and difficult to be systematically and effectively utilized.

SUMMARY

An objective of the present disclosure is to provide an improved method and apparatus for processing information to solve the technical problems mentioned in the foregoing background section.

In a first aspect, embodiments of the present disclosure provides a method for processing information. The method for processing information comprises: acquiring a target behavior information set, the target behavior information set comprising behavior information associated with at least two groups of identity identifiers, the behavior information comprising behavior information of an online behavior and/or an offline behavior, and different groups of identity identifiers corresponding to different unique identity identifiers; selecting, from at least two unique identity identifiers corresponding to the at least two groups of identity identifiers, a unique identity identifier as a target unique identity identifier, based on at least one kind of specified user attribute information; and associating, for each target unique identity identifier of the selected target unique identity identifier, behavior information associated with identity identifiers corresponding to the target unique identity identifier with the target unique identity identifier, to obtain behavior information associated with the target unique identity identifier.

In some embodiments, the associating, for each target unique identity identifier of the selected target unique identity identifier, behavior information associated with identity identifiers corresponding to the target unique identity identifier with the target unique identity identifier, to obtain behavior information associated with the target unique identity identifier comprises: performing, using an identity identifier mapping technique, for each target unique identity identifier, an association mapping between the behavior information associated with the identity identifiers corresponding to the target unique identity identifier and the target unique identity identifier, to obtain the behavior information associated with the target unique identity identifier.

In some embodiments, selecting, from at least two unique identity identifiers corresponding to the at least two groups of identity identifiers, a unique identity identifier matching at least one kind of specified user attribute information as a target unique identity identifier, based on the at least one kind of specified user attribute information comprises: selecting, from the at least two unique identity identifiers, the unique identity identifier matching with the at least one kind of specified user attribute information as the target unique identity identifier, according to at least one kind of user attribute information pre-stored and associated with the at least two unique identity identifiers.

In some embodiments, after the associating, for each target unique identity identifier, the behavior information associated with the identity identifiers corresponding to the target unique identity identifier with the target unique identity identifier, to obtain the behavior information associated with the target unique identity identifier, the method further comprises: analyzing attribute information and/or the behavior information associated with the target unique identity identifier according to analysis target information, to generate an analysis result conforming to the analysis target information. The analysis target information includes an attribute parameter and/or a behavior parameter.

In some embodiments, before the analyzing attribute information and/or the behavior information associated with the target unique identity identifier according to analysis target information, to generate an analysis result conforming to the analysis target information, the method further comprises: acquiring demand information, and determining the analysis target information according to the demand information.

In a second aspect, the present disclosure provides an apparatus for processing information. The apparatus comprises: an acquiring unit, configured to acquire a target behavior information set, the target behavior information set comprising behavior information associated with at least two groups of identity identifiers, the behavior information comprising behavior information of an online behavior and/or an offline behavior, and different groups of identity identifiers corresponding to different unique identity identifiers; a selecting unit, configured to select, from at least two unique identity identifiers corresponding to the at least two groups of identity identifiers, a unique identity identifier as a target unique identity identifier, based on at least one kind of specified user attribute information; and an associating unit, configured to associate, for each target unique identity identifier of the selected target unique identity identifier, behavior information associated with identity identifiers corresponding to the target unique identity identifier with the target unique identity identifier, to obtain behavior information associated with the target unique identity identifier.

In some embodiments, the associating unit is further configured to: perform, using an identity identifier mapping technique, for each target unique identity identifier of the selected target unique identity identifier, an association mapping between the behavior information associated with the identity identifiers corresponding to the target unique identity identifier and the target unique identity identifier, to obtain the behavior information associated with the target unique identity identifier.

In some embodiments, the selecting unit is further configured to: select, from the at least two unique identity identifiers, the unique identity identifier matching with the at least one kind of specified user attribute information as the target unique identity identifier, according to at least one kind of user attribute information pre-stored and associated with the at least two unique identity identifiers.

In some embodiments, the apparatus further comprises: an analyzing unit, configured to analyze attribute information and/or the behavior information associated with the target unique identity identifier according to analysis target information, to generate an analysis result conforming to the analysis target information. The analysis target information includes an attribute parameter and/or a behavior parameter.

In some embodiments, the apparatus further comprises: an information acquiring unit, configured to acquire demand information, and determine the analysis target information according to the demand information.

In a third aspect, the embodiments of the present disclosure provide a server. The server comprises: one or more processors; and a storage device configured to store one or more programs. The one or more programs, when executed by the one or more processors, cause the one or more processors to implement the method as described in any embodiment of the method for processing information.

In a fourth aspect, the embodiments of the present disclosure provide a computer readable storage medium storing a computer program. The program, when executed by a processor, implements the method as described in any embodiment of the method for processing information.

According to the method and apparatus for processing information provided by the embodiments of the present disclosure, first, the target behavior information set is acquired. The target behavior information set includes the behavior information associated with the at least two groups of identity identifiers, and the behavior information includes the behavior information of the online behavior and/or the offline behavior. Then, the unique identity identifier matching with the at least one kind of specified user attribute information is selected as the target unique identity identifier from the at least two unique identity identifiers corresponding to the at least two groups of identity identifiers. Different groups of identity identifiers correspond to different unique identity identifiers. Finally, for each target unique identity identifier, the behavior information associated with the identity identifiers corresponding to the target unique identity identifier is associated with the target unique identity identifier to obtain behavior information associated with the target unique identity identifier. Accordingly, various kinds of behavior information of a user are associated with the target unique identity identifier, to facilitate the utilization and the analysis for the behavior information.

BRIEF DESCRIPTION OF THE DRAWINGS

By reading detailed descriptions of non-limiting embodiments described with reference to the following accompanying drawings, other features, objectives and advantages of the present disclosure will be more apparent.

DETAILED DESCRIPTION OF EMBODIMENTS

The present disclosure will be further described below in detail in combination with the accompanying drawings and the embodiments. It should be appreciated that the specific embodiments described herein are merely used for explaining the relevant disclosure, rather than limiting the disclosure. In addition, it should be noted that, for the ease of description, only the parts related to the relevant disclosure are shown in the accompanying drawings.

It should also be noted that the embodiments in the present disclosure and the features in the embodiments may be combined with each other on a non-conflict basis. The present disclosure will be described below in detail with reference to the accompanying drawings and in combination with the embodiments.

Figure 1:
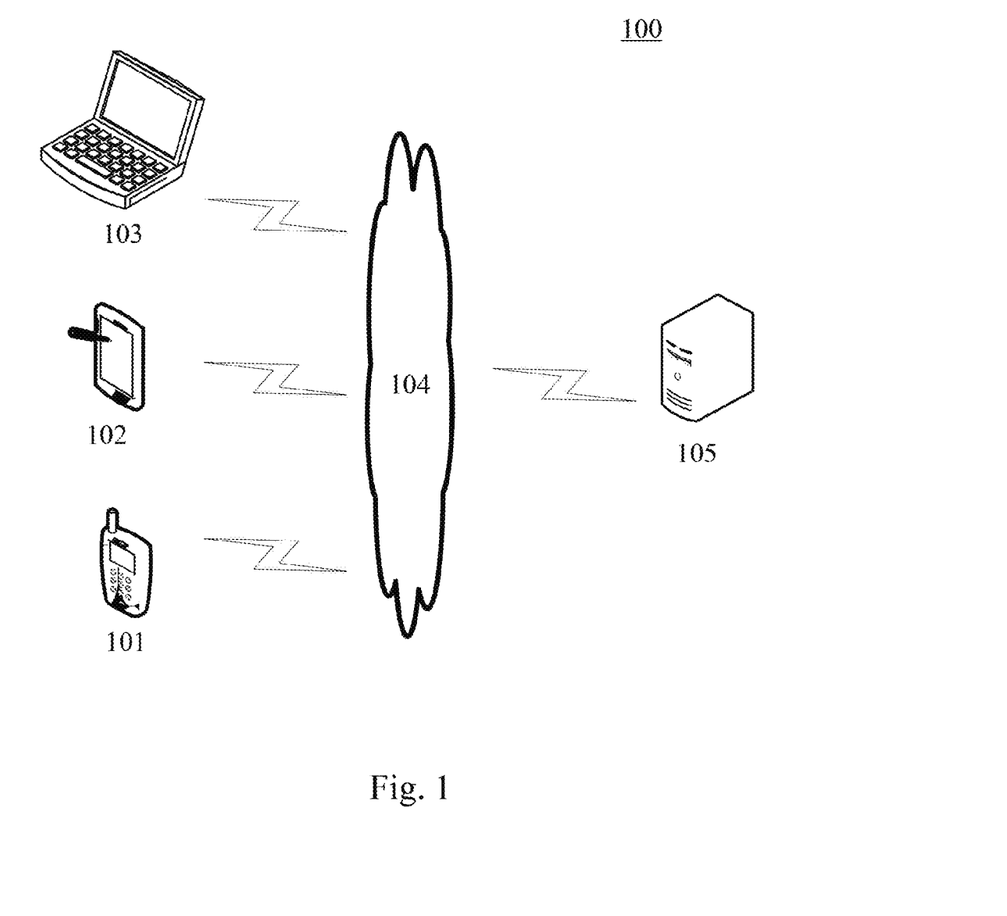
FIG. 1 is an exemplary system architecture diagram applicable to the present disclosure.

FIG. 1 shows an exemplary architecture of a system 100 which may be used by an information processing method or an information processing apparatus according to the embodiments of the present disclosure.

As shown in FIG. 1, the system architecture 100 may include terminal devices 101, 102 and 103, a network 104 and a server 105. The network 104 serves as a medium providing a communication link between the terminal devices 101, 102 and 103 and the server 105. The network 104 may include various types of connections, such as wired or wireless transmission links, or optical fibers.

The user may use the terminal devices 101, 102 and 103 to interact with the server 105 through the network 104, in order to transmit or receive messages, etc. Various communication client applications, such as cloud storage applications, shopping applications, search applications, instant messaging tools, mailbox clients, and social platform software may be installed on the terminal devices 101, 102 and 103.

The terminal devices 101, 102 and 103 may be various electronic devices having display screens and supporting data receptions, including but not limited to, smart phones, tablet computers, e-book readers, MP3 (Moving Picture Experts Group Audio Layer III) players, MP4 (Moving Picture Experts Group Audio Layer IV) players, laptop computers and desktop computers.

The server 105 may be a server providing various services, for example, a backend server supporting information displayed by the terminal devices 101, 102 or 103. The backend server may perform a processing such as analysis on data such as received behavior information associated with at least two groups of identity identifiers, and return a processing result to the terminal devices.

It should be noted that the information processing method according to the embodiments of the present disclosure is generally executed by the server 105. Accordingly, an information processing apparatus is generally installed on the server 105.

It should be understood that the numbers of the terminal devices, the networks and the servers in FIG. 1 are merely illustrative. Any number of terminal devices, networks and servers may be provided based on the actual requirements.

Figure 2:
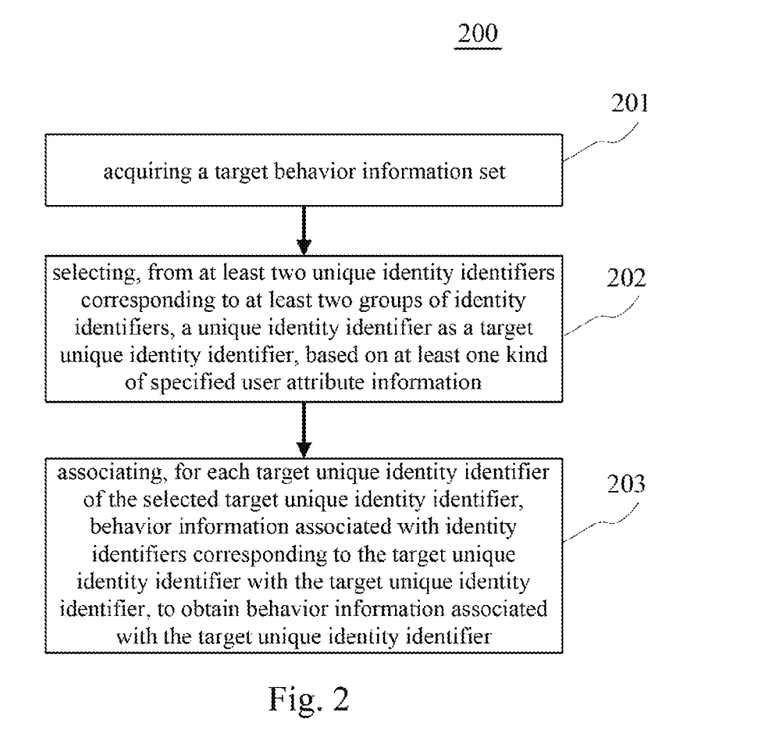
FIG. 2 is a flowchart of an embodiment of a method for processing information according to the present disclosure.

Further referring to FIG. 2, which illustrates a flow 200 of an embodiment of a method for processing information according to the present disclosure. The method for processing information includes the steps 201 to 203.

Step 201 includes acquiring a target behavior information set.

In this embodiment, an electronic device (for example, the server as illustrated in FIG. 1) on which the method for processing information is performed may acquire the target behavior information set from local or other electronic devices. The target behavior information set includes behavior information associated with at least two groups of identity identifiers, and the behavior information includes behavior information of an online behavior and/or an offline behavior. The target behavior information set may include behavior information within a period of time and/or in a geographic area and the like. The identity identifier may be a randomly generated character or character string for identifying an identity of a user. The behavior information of the online behavior/offline behavior may be information generated by the online behavior and/or the offline behavior of the user. For example, the behavior information of the offline behavior may be a name of a shop located at a certain geographic location and visited by the user within a period of time. The behavior information of the online behavior may be a retrieval word searched by the user within a period of time.

The identity identifier of the user may also be referred to as the ID of the user. Each user may have multiple identity identifiers. For example, the identity identifier may be a mobile phone number of the user, an account number of a web page side, a device number of a mobile phone, and the like. One group of identity identifiers includes one or more identity identifiers.

Different groups of identity identifiers correspond to different unique identity identifiers. The unique identity identifier is an identifier that is unique and can indicate the identity of the user. A unique identity identifier of each user is different. An identity identifier of a same user may form one group, so that there is a one-to-one correspondence between at least two unique identity identifiers and the at least two groups of identity identifiers, and thus different groups of identity identifiers correspond to different unique identity identifiers. The identity identifier and the unique identity identifier corresponding thereto indicate the same user. The correspondence may be pre-established or pre-acquired.

step 202 includes selecting, from at least two unique identity identifiers corresponding to at least two groups of identity identifiers, a unique identity identifier as a target unique identity identifier, based on at least one kind of specified user attribute information.

In this embodiment, the electronic device selects the unique identity identifier from the at least two unique identity identifiers based on the at least one kind of specified user attribute information, and use the selected unique identity identifier as the target unique identity identifier. The number of the target unique identity identifier selected here may be one or more. The user attribute information may be information of characters of the user itself or information of a historical behavior of the user, for example, a gender, an age, a resident geographic location of the user, the retrieval word searched by the user within the period of time, etc. The gender may be female, the age may be 18 years old and above, and so on. For a same user, the user attribute information is associated with the unique identity identifier. One or more kinds of the user attribute information may be selected as the specified user attribute information.

In practice, a matching unique identity identifier is selected, that is, the unique identity identifier of the user having an attribute indicated by the specified user attribute information is selected. Since the unique identity identifier is associated with the user attribute information, it may be determined that the unique identity identifier whose user attribute information is the specified user attribute information matches the specified user attribute information.

Step 203 includes associating, for each target unique identity identifier of the selected target unique identity identifier, behavior information associated with identity identifiers corresponding to the target unique identity identifier with the target unique identity identifier, to obtain behavior information associated with the target unique identity identifier.

In this embodiment, for each target unique identity identifier of the selected target unique identity identifiers, the electronic device associates the behavior information associated with identity identifiers corresponding to the target unique identity identifier with the target unique identity identifier, and the behavior information associated with the target unique identity identifier may be obtained after the association. Although a piece of behavior information associated with each identity identifier is the behavior information of the user, each piece of behavior information can only be associated with one identity identifier, and pieces of behavior information associated with different identity identifiers do not have any association, which is not conductive to the utilization of the behavior information.

The electronic device may associate behavior information of a specific user associated with identity identifiers with a unique identity identifier of the user. Specifically, since the identity identifiers corresponds to the target unique identity identifier, and the identifiers are associated with the behavior information, the behavior information may be associated with the target unique identity identifier through the identity identifiers. After the association, the behavior information of the user can be found out through the unique identity identifier of the user. In addition, the user can also be found out through any piece of behavior information of the user.

Figure 3:
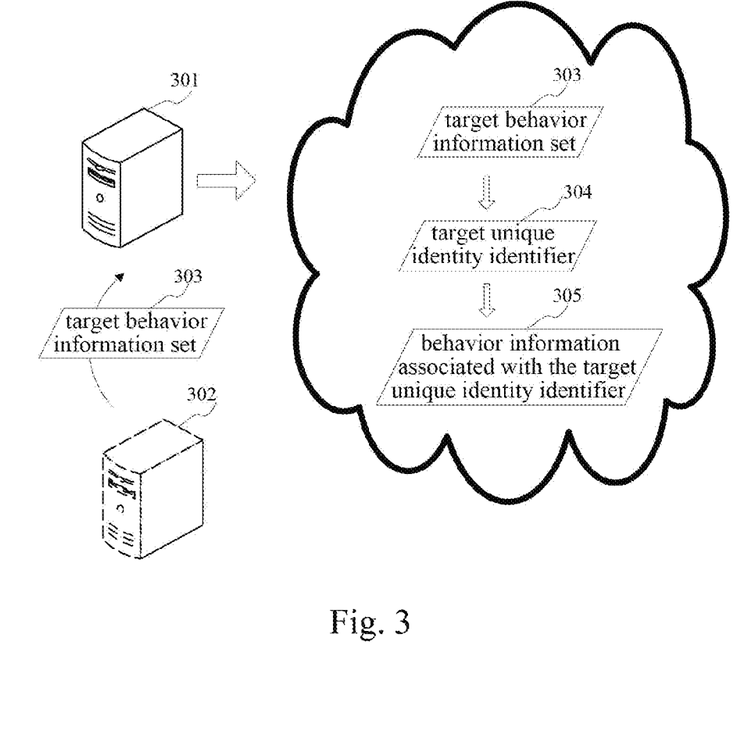
FIG. 3 is a schematic diagram of an application scenario of the method for processing information according to the present disclosure.

Further referring to FIG. 3, which is a schematic diagram of an application scenario of the method for processing information according to this embodiment. In the application scenario of FIG. 3, the server 301 may acquire the target behavior information set 303 from local or the other electronic device 302. The target behavior information set 303 includes behavior information associated with at least two groups of identity identifiers, and the behavior information includes the behavior information of the online behavior and/or the offline behavior. Then, based on the at least one kind of specified user attribute information, the server 301 selects unique identity identifiers of female users aged 18 years as the target unique identity identifiers 304 from the at least two unique identity identifiers corresponding to the at least two groups of identity identifiers. Finally, for each target unique identity identifier 304, the server 301 associates the behavior information associated with identity identifiers corresponding to the target unique identity identifier 304 with the target unique identity identifier 304, to obtain the behavior information 305 associated with the target unique identity identifier 304.

According to the method provided by the above embodiment of the present disclosure, various kinds of behavior information of the user are associated with the target unique identity identifier to facilitate the utilization and the analysis for the behavior information.

Figure 4:
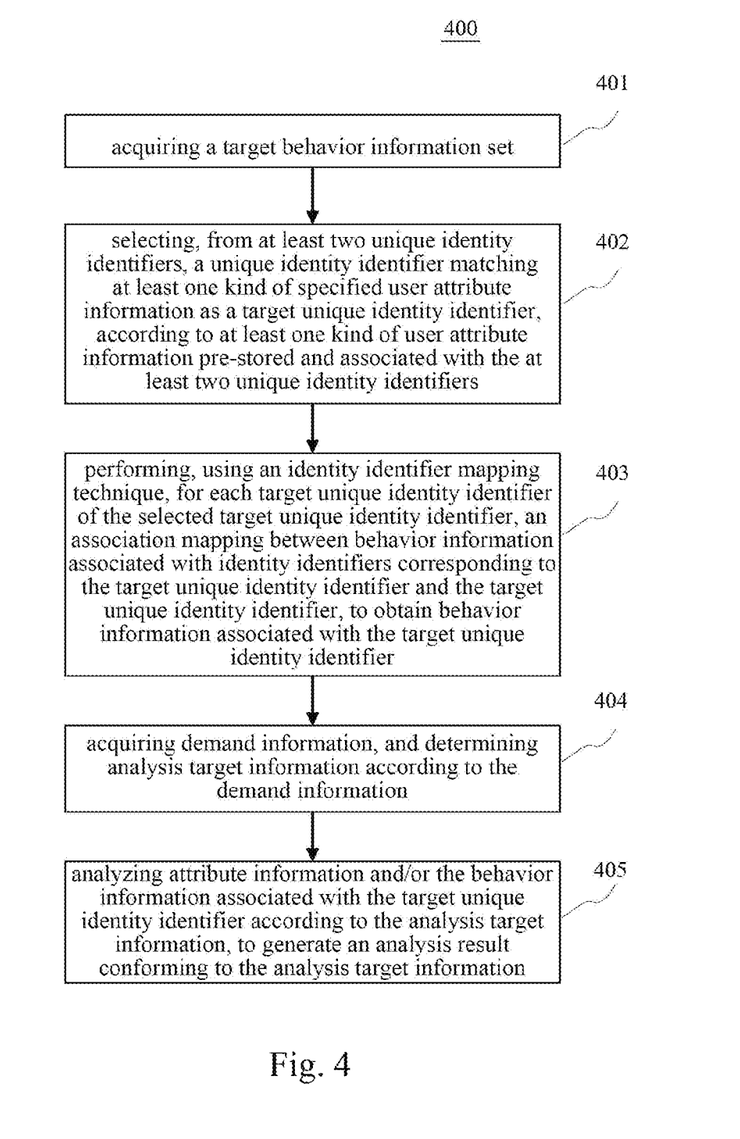
FIG. 4 is a flowchart of another embodiment of the method for processing information according to the present disclosure.

Further referring to FIG. 4, FIG. 4 illustrates a flow 400 of another embodiment of the method for processing information. The flow 400 of the method for processing information includes steps 401 to 405.

Step 401 includes acquiring a target behavior information set.

In this embodiment, a server may acquire the target behavior information set. The target behavior information set includes behavior information associated with at least two groups of identity identifiers, and the behavior information includes behavior information of an online behavior and/or an offline behavior. The target behavior information set may include behavior information within a period of time and/or in a geographic area and the like. The identity identifier may be a randomly generated character or character string for identifying an identity of a user. The behavior information of the online behavior/offline behavior may be information generated by the online behavior and/or the offline behavior of the user. For example, the behavior information of the offline behavior may be a name of a shop located at a certain geographic location and visited by the user within a period of time. The behavior information of the online behavior may be a retrieval word searched by the user within a period of time. Different groups of identity identifiers correspond to different unique identity identifiers.

Step 402 includes selecting, from at least two unique identity identifiers, a unique identity identifier matching with at least one kind of specified user attribute information as a target unique identity identifier, according to at least one kind of user attribute information pre-stored and associated with the at least two unique identity identifiers.

In this embodiment, the at least one kind of user attribute information associated with the at least two unique identity identifiers is pre-stored in the local of the server or an electronic device communicated with the server. According to the pre-stored attribute information, the server selects, from the at least two unique identity identifiers, the unique identity identifier matching with the at least one kind of specified user attribute information as the target unique identity identifier. It may be determined that the unique identity identifier whose user attribute information is the specified user attribute information matches the specified user attribute information.

Step 403 includes performing, using an identity identifier mapping technique, for each target unique identity identifier of the selected target unique identity identifier, an association mapping between behavior information associated with identity identifiers corresponding to the target unique identity identifier and the target unique identity identifier, to obtain behavior information associated with the target unique identity identifier.

In this embodiment, for each target unique identity identifier of the selected target unique identity identifier, the server performs, using the identity identifier mapping technique, the association mapping between the behavior information associated with identity identifiers corresponding to the target unique identity identifier and the target unique identity identifier. Accordingly, the behavior information is associated with the target unique identity identifier to obtain the behavior information associated with the target unique identity identifier.

In practice, the association mapping is a mapping way which may associate the behavior information with the target unique identity identifier through the identity identifiers.

Step 404 includes acquiring demand information, and determining analysis target information according to the demand information.

In this embodiment, the server acquires the demand information and determines the analysis target information according to the demand information. The analysis target information includes an attribute parameter and/or behavior parameter. The demand information is information reflecting at least one kind of demand for information associated with the unique identity identifier. The demand information may be demand information related to a geographic location, time or a group of people. The analysis target information is target information to be obtained by analysis using the attribute information and/or behavior information associated with the target unique identity identifier. Here, the demand information may be information of a specific scenario provided by a person and may have abundant descriptive contents.

The attribute parameter may be a restricted parameter of the attribute information in the subsequent analysis using the attribute information and/or behavior information associated with the target unique identity identifier. For example, the attribute parameter may be a gender, an age, a height of a person, a resident geographic location, etc. The behavior parameter may be a restricted parameter of the behavior information in the subsequent analysis using the attribute information and/or behavior information associated with the target unique identity identifier. For example, the behavior parameter may be time that a behavior is performed a location where the behavior is performed, an object of the behavior, etc. The demand information may indicate one of the attribute parameter and the behavior parameter, or both.

For example, the demand information is a ratio of adult men to adult women, both of whom access web pages in Dongcheng District on January 1 of this year. The analysis target information is a ratio of men to women aged 18 years and above who access web pages through the IP (Internet Protocol, which is a protocol for an interconnection between networks) in the geographic area of Dongcheng District on Jan. 1, 2017. The attribute parameters include 18 years old and above, men and women, and the behavior parameters include Jan. 1, 2017, Dongcheng District, and web page access.

Step 405 includes analyzing the attribute information and/or the behavior information associated with the target unique identity identifier according to the analysis target information, to generate an analysis result conforming to the analysis target information.

In this embodiment, the server analyzes the attribute information and/or the behavior information associated with the target unique identity identifier according to the determined analysis target information, to generate the analysis result conforming to the analysis target information.

Specific analysis methods may be a population distribution thermodynamic diagram analysis, a population profile analysis, and so on. Since the behavior information and the attribute information are associated with the target unique identity identifier, and there is a one-to-one correspondence between the target unique identity identifier and the user, a specific user of the analysis result may be confirmed.

According to this embodiment, the analysis can be performed according to the demand information, which makes the analysis process more targeted.

Figure 5:
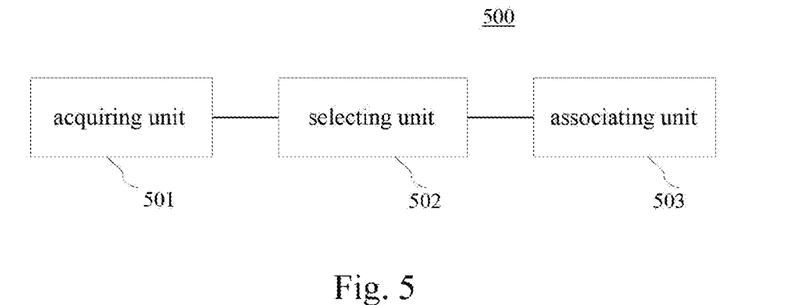
FIG. 5 is a schematic structural diagram of an embodiment of an apparatus for processing information according to the present disclosure.

Further referring to FIG. 5, as an implementation of the method shown in each of the above-mentioned figures, the present disclosure provides an embodiment of an information processing apparatus. The embodiment of this apparatus corresponds to the embodiment of the method as illustrated in FIG. 2, and this apparatus may be applied in various electronic devices.

As shown in FIG. 5, the information processing apparatus 500 in this embodiment includes: an acquiring unit 501, a selecting unit 502 and an associating unit 503. The acquiring unit 501 is configured to acquire a target behavior information set. The target behavior information set includes behavior information associated with at least two groups of identity identifiers, and the behavior information includes behavior information of an online behavior and/or an offline behavior. Different groups of identity identifiers correspond to different unique identity identifiers. The selecting unit 502 is configured to select, from at least two unique identity identifiers corresponding to the at least two groups of identity identifiers, a unique identity identifier as a target unique identity identifier, based on at least one kind of specified user attribute information. The associating unit 503 is configured to associate, for each target unique identity identifier of the selected target unique identity identifier, behavior information associated with identity identifiers corresponding to the target unique identity identifier with the target unique identity identifier, to obtain behavior information associated with the target unique identity identifier.

In this embodiment, the acquiring unit 501 of the information processing apparatus 500 may acquire the target behavior information set. The target behavior information set includes the behavior information associated with the at least two groups of identity identifiers, and the behavior information includes the behavior information of the online behavior and/or the offline behavior. The target behavior information set may include behavior information within a period of time and/or in a geographic area and the like. The identity identifier may be a randomly generated character or character string for identifying an identity of a user. The behavior information of the online behavior/offline behavior may be information generated by the online behavior and/or the offline behavior of the user. For example, the behavior information of the offline behavior may be a name of a shop located at a certain geographic location and visited by the user within a period of time. The behavior information of the online behavior may be a retrieval word searched by the user within a period of time.

In this embodiment, the selecting unit 502 selects the unique identity identifier matching with the at least one kind of specified user attribute information from the at least two unique identity identifiers, and uses the selected unique identity identifier as the target unique identity identifier. Identity identifiers of the same user may form one group, so that there is a one-to-one correspondence between the at least two unique identity identifiers and the at least two groups of identity identifiers, and thus different groups of identity identifiers correspond to the different unique identity identifiers. The identity identifiers and unique identity identifier corresponding thereto indicate the same user. The correspondence may be pre-established or pre-acquired. The user attribute information may be information of characters of the user itself, and may also be information of a historical behavior of the user, for example, a gender, an age, a resident geographic location of the user, the retrieval word searched by the user within the period of time, etc. For a same user, the user attribute information is associated with the unique identity identifier. Here, the user attribute information may be population attribute information. One or more kinds of the user attribute information may be selected as the specified user attribute information.

In this embodiment, for each target unique identity identifier of the selected target unique identity identifier, the associating unit 503 associates the behavior information associated with the identity identifiers corresponding to the target unique identity identifier with the target unique identity identifier, and the behavior information associated with the target unique identity identifier may be obtained after the association. Although the behavior information associated with the identity identifiers is the behavior information of the user, each piece of behavior information can only be associated with one identity identifier, and different pieces of behavior information associated with different identity identifiers has no association, which is not conductive to the utilization of the behavior information.

In some alternative implementations of this embodiment, the associating unit is further configured to: perform, using an identity identifier mapping technique, for each target unique identity identifier of the selected target unique identity identifier, an association mapping between behavior information associated with identity identifiers corresponding to the target unique identity identifier and the target unique identity identifier, to obtain the behavior information associated with the target unique identity identifier.

In some alternative implementations of this embodiment, the selecting unit is further configured to: select, from the at least two unique identity identifiers, the unique identity identifier matching with the at least one kind of specified user attribute information as the target unique identity identifier, according to at least one kind of user attribute information pre-stored and associated with the at least two unique identity identifiers.

In some alternative implementations of this embodiment, the apparatus further includes an analyzing unit (not shown), configured to analyze attribute information and/or the behavior information associated with the target unique identity identifier according to analysis target information, to generate an analysis result conforming to the analysis target information. The analysis target information includes an attribute parameter and/or a behavior parameter.

In some alternative implementations of this embodiment, the apparatus further includes an information acquiring unit (not shown), configured to acquire demand information, and determine the analysis target information according to the demand information.

Figure 6:
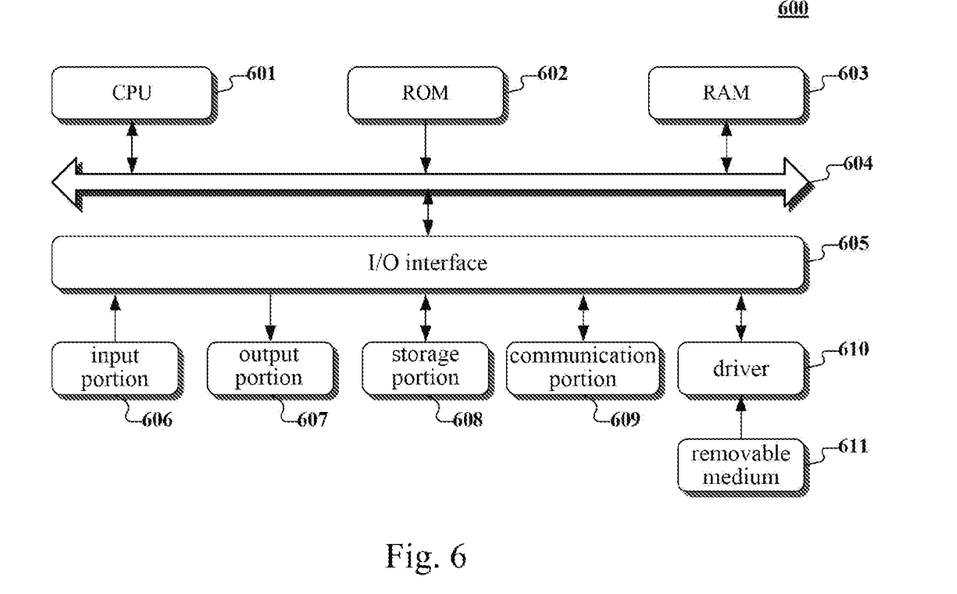
FIG. 6 is a schematic structural diagram of a computer system adapted to implement a server according to embodiments of the present disclosure.

Referring to FIG. 6, a schematic structural diagram of a computer system 600 adapted to implement a server of the embodiments of the present disclosure is shown. The server shown in FIG. 6 only is an example and should not be a limitation of the function and range of the embodiment of the disclosure.

As shown in FIG. 6, the computer system 600 includes a central processing unit (CPU) 601, which may execute various appropriate actions and processes in accordance with a program stored in a read-only memory (ROM) 602 or a program loaded into a random access memory (RAM) 603 from a storage portion 608. The RAM 603 also stores various programs and data required by operations of the system 600. The CPU 601, the ROM 602 and the RAM 603 are connected to each other through a bus 604. An input/output (I/O) interface 605 is also connected to the bus 604.

The following components are connected to the I/O interface 605: an input portion 606 including a keyboard, a mouse etc.; an output portion 607 including a cathode ray tube (CRT), a liquid crystal display device (LCD), a speaker etc.; a storage portion 608 including a hard disk and the like; and a communication portion 609 comprising a network interface card, such as a LAN card and a modem. The communication portion 609 performs communication processes via a network, such as the Internet. A driver 610 is also connected to the I/O interface 605 as required. A removable medium 611, such as a magnetic disk, an optical disk, a magneto-optical disk, and a semiconductor memory, may be installed on the driver 610, to facilitate the retrieval of a computer program from the removable medium 611, and the installation thereof on the storage portion 608 as needed.

In particular, according to embodiments of the present disclosure, the process described above with reference to the flow chart may be implemented in a computer software program. For example, an embodiment of the present disclosure includes a computer program product, which comprises a computer program that is loaded in a computer-readable medium. The computer program comprises program codes for executing the method as illustrated in the flow chart. In such an embodiment, the computer program may be downloaded and installed from a network via the communication portion 609, and/or may be installed from the removable media 611. The computer program, when executed by the central processing unit (CPU) 601, implements the above mentioned functionalities as defined by the methods of the present disclosure.

It should be noted that the computer readable medium in the present disclosure may be computer readable signal medium or computer readable storage medium or any combination of the above two. An example of the computer readable storage medium may include, but not limited to: electric, magnetic, optical, electromagnetic, infrared, or semiconductor systems, apparatus, elements, or a combination any of the above. A more specific example of the computer readable storage medium may include but is not limited to: electrical connection with one or more wire, a portable computer disk, a hard disk, a random access memory (RAM), a read only memory (ROM), an erasable programmable read only memory (EPROM or flash memory), a fibre, a portable compact disk read only memory (CD-ROM), an optical memory, a magnet memory or any suitable combination of the above. In the present disclosure, the computer readable storage medium may be any physical medium containing or storing programs which can be used by a command execution system, apparatus or element or incorporated thereto. In the present disclosure, the computer readable signal medium may include data signal in the base band or propagating as parts of a carrier, in which computer readable program codes are carried. The propagating signal may take various forms, including but not limited to: an electromagnetic signal, an optical signal or any suitable combination of the above. The signal medium that can be read by computer may be any computer readable medium except for the computer readable storage medium. The computer readable medium is capable of transmitting, propagating or transferring programs for use by, or used in combination with, a command execution system, apparatus or element. The program codes contained on the computer readable medium may be transmitted with any suitable medium including but not limited to: wireless, wired, optical cable, RF medium etc., or any suitable combination of the above.

The flow charts and block diagrams in the accompanying drawings illustrate architectures, functions and operations that may be implemented according to the systems, methods and computer program products of the various embodiments of the present disclosure. In this regard, each of the blocks in the flow charts or block diagrams may represent a module, a program segment, or a code portion, said module, program segment, or code portion comprising one or more executable instructions for implementing specified logic functions. It should also be noted that, in some alternative implementations, the functions denoted by the blocks may occur in a sequence different from the sequences shown in the figures. For example, any two blocks presented in succession may be executed, substantially in parallel, or they may sometimes be in a reverse sequence, depending on the function involved. It should also be noted that each block in the block diagrams and/or flow charts as well as a combination of blocks may be implemented using a dedicated hardware-based system executing specified functions or operations, or by a combination of a dedicated hardware and computer instruction.

The units or modules involved in the embodiments of the present disclosure may be implemented by means of software or hardware. The described units or modules may also be provided in a processor, for example, described as: a processor, comprising an obtaining unit, a selection unit and an association unit, where the names of these units or modules do not in some cases constitute a limitation to such units or modules themselves. For example, the obtaining unit may also be described as "a unit for obtaining a target behavior information set."

In another aspect, the present disclosure further provides a computer-readable storage medium. The computer-readable storage medium may be the computer storage medium included in the apparatus in the above described embodiments, or a stand-alone computer-readable storage medium not assembled into the apparatus. The computer-readable storage medium stores one or more programs. The one or more programs, when executed by a device, cause the device to: acquire a target behavior information set, the target behavior information set comprising behavior information associated with at least two groups of identity identifiers, the behavior information comprising behavior information of an online behavior and/or an offline behavior, and different groups of identity identifiers corresponding to different unique identity identifiers; select, from at least two unique identity identifiers corresponding to the at least two groups of identity identifiers, a unique identity identifier as a target unique identity identifier, based on at least one kind of specified user attribute information; and associate, for each target unique identity identifier of the selected target unique identity identifier, behavior information associated with identity identifiers corresponding to the target unique identity identifier with the target unique identity identifier, to obtain behavior information associated with the target unique identity identifier.

The above description only provides an explanation of the preferred embodiments of the present disclosure and the technical principles used. It should be appreciated by those skilled in the art that the inventive scope of the present disclosure is not limited to the technical solutions formed by the particular combinations of the above-described technical features. The inventive scope should also cover other technical solutions formed by any combinations of the above-described technical features or equivalent features thereof without departing from the concept of the disclosure. Technical schemes formed by the above-described features being interchanged with, but not limited to, technical features with similar functions disclosed in the present disclosure are examples.

What is claimed is:

1. A method for processing information, comprising:
acquiring a target behavior information set, the target behavior information set comprising behavior information associated with at least two groups of identity identifiers, the behavior information comprising behavior information of an offline behavior, and respective groups of identity identifiers corresponding to respective unique identity identifiers;
selecting, from at least two unique identity identifiers corresponding to the at least two groups of identity identifiers, a unique identity identifier as a target unique identity identifier, based on at least one kind of specified user attribute information;

associating, for each target unique identity identifier of the selected target unique identity identifier, behavior information associated with identity identifiers corresponding to the target unique identity identifier with the target unique identity identifier, to obtain behavior information associated with the target unique identity identifier;

acquiring demanding information comprising a ratio between different groups of people, and determining an analysis target information according to the demand information; and analyzing at least one of attribute information and the behavior information associated with the target unique identity identifier according to analysis target information, to generate an analysis result conforming to the analysis target information, wherein the analysis target information comprises at least one of attribute parameter and a behavior parameter.

2. The method according to claim 1, wherein the associating, for each target unique identity identifier of the selected target unique identity identifier, behavior information associated with identity identifiers corresponding to the target unique identity identifier with the target unique identity identifier, to obtain behavior information associated with the target unique identity identifier comprises:

performing, using an identity identifier mapping technique, for each target unique identity identifier of the selected target unique identity identifier, an association mapping between the behavior information associated with identity identifiers corresponding to the target unique identity identifier and the target unique identity identifier, to obtain the behavior information associated with the target unique identity identifier.

3. The method according to claim 1, wherein the selecting, from at least two unique identity identifiers corresponding to the at least two groups of identity identifiers, a unique identity identifier as a target unique identity identifier, based on at least one kind of specified user attribute information comprises:

selecting, from the at least two unique identity identifiers, a unique identity identifier matching the at least one kind of specified user attribute information as the target unique identity identifier, according to at least one kind of user attribute information pre-stored and associated with the at least two unique identity identifiers.

4. The method according to claim 1, wherein the behavior information of the offline behavior includes a name of a shop located at a geographic location and visited by a user.

5. The method according to claim 1, wherein the at least one of attribute information and the behavior information associated with the target unique identity identifier is analyzed by performing a population distribution thermodynamic diagram analysis.

6. The method according to claim 1, wherein the at least one of attribute information and the behavior information associated with the target unique identity identifier is analyzed by performing a population profile analysis.

7. The method according to claim 1, wherein the ratio between different groups of people is a ratio of adult men to adult women.

8. An apparatus for processing information, comprising:
at least one processor; and
a memory storing instructions, the instructions when executed by the at least one processor, cause the at least one processor to perform operations, the operations comprising:

acquiring a target behavior information set, the target behavior information set comprising behavior information associated with at least two groups of identity identifiers, the behavior information comprising behavior information of an offline behavior, and respective groups of identity identifiers corresponding to respective unique identity identifiers;

selecting, from at least two unique identity identifiers corresponding to the at least two groups of identity identifiers, a unique identity identifier as a target unique identity identifier, based on at least one kind of specified user attribute information;

associating, for each target unique identity identifier of the selected target unique identity identifier, behavior information associated with identity identifiers corresponding to the target unique identity identifier with the target unique identity identifier, to obtain behavior information associated with the target unique identity identifier;

acquiring demanding information comprising a ratio between different groups of people, and determining an analysis target information according to the demand information; and analyzing at least one of attribute information and the behavior information associated with the target unique identity identifier according to analysis target information, to generate an analysis result conforming to the analysis target information, wherein the analysis target information comprises at least one of attribute parameter and a behavior parameter.

9. The apparatus according to claim 8, wherein the associating, for each target unique identity identifier of the selected target unique identity identifier, behavior information associated with identity identifiers corresponding to the target unique identity identifier with the target unique identity identifier, to obtain behavior information associated with the target unique identity identifier comprises:

performing, using an identity identifier mapping technique, for each target unique identity identifier of the selected target unique identity identifier, an association mapping between the behavior information associated with identity identifiers corresponding to the target unique identity identifier and the target unique identity identifier, to obtain the behavior information associated with the target unique identity identifier.

10. The apparatus according to claim 8, wherein the selecting, from at least two unique identity identifiers corresponding to the at least two groups of identity identifiers, a unique identity identifier as a target unique identity identifier, based on at least one kind of specified user attribute information comprises:

selecting, from the at least two unique identity identifiers, a unique identity identifier matching the at least one kind of specified user attribute information as the target unique identity identifier, according to at least one kind of user attribute information pre-stored and associated with the at least two unique identity identifiers.

11. A non-transitory computer storage medium, storing a computer program, wherein the program, when executed by a processor, cause the processor to perform operations, the operations comprising:

acquiring a target behavior information set, the target behavior information set comprising behavior information associated with at least two groups of identity identifiers, the behavior information comprising behavior information of an offline behavior, and respective groups of identity identifiers corresponding to respective unique identity identifiers;

selecting, from at least two unique identity identifiers corresponding to the at least two groups of identity identifiers, a unique identity identifier as a target unique identity identifier, based on at least one kind of specified user attribute information;

associating, for each target unique identity identifier of the selected target unique identity identifier, behavior information associated with identity identifiers corresponding to the target unique identity identifier with the target unique identity identifier, to obtain behavior information associated with the target unique identity identifier;

acquiring demanding information comprising a ratio between different groups of people, and determining an analysis target information according to the demand information; and analyzing at least one of attribute information and the behavior information associated with the target unique identity identifier according to analysis target information, to generate an analysis result conforming to the analysis target information, wherein the analysis target information comprises at least one of attribute parameter and a behavior parameter.

12. The apparatus according to claim 8, wherein the behavior information of the offline behavior includes a name of a shop located at a geographic location and visited by a user.

13. The apparatus according to claim 8, wherein the at least one of attribute information and the behavior information associated with the target unique identity identifier is analyzed by performing a population distribution thermodynamic diagram analysis.

14. The apparatus according to claim 8, wherein the at least one of attribute information and the behavior information associated with the target unique identity identifier is analyzed by performing a population profile analysis.

15. The apparatus according to claim 8, wherein the ratio between different groups of people is a ratio of adult men to adult women.

* * * * *